United States Patent
Kwon et al.

(10) Patent No.: US 9,125,183 B2
(45) Date of Patent: Sep. 1, 2015

(54) COMPACT TRANSCEIVER ARCHITECTURE FOR ACHIEVING DEVICE TO DEVICE (D2D) COMMUNICATION USING UPLINK AND DOWNLINK CARRIER FREQUENCIES

(75) Inventors: Young Hoon Kwon, San Diego, CA (US); Jorge Fabrega Sanchez, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 163 days.

(21) Appl. No.: 13/409,963

(22) Filed: Mar. 1, 2012

(65) Prior Publication Data

US 2013/0230026 A1    Sep. 5, 2013

(51) Int. Cl.
  *H04W 76/02* (2009.01)
  *H04B 1/403* (2015.01)
  *H04W 88/06* (2009.01)
  (Continued)

(52) U.S. Cl.
  CPC .............. *H04W 76/023* (2013.01); *H04B 1/403* (2013.01); *H04B 1/0028* (2013.01); *H04B 7/15542* (2013.01); *H04W 88/06* (2013.01)

(58) Field of Classification Search
  CPC ... H04W 72/042; H04W 88/06; H04W 48/08; H04W 24/10; H04W 28/04; H04W 48/16; H04W 72/04; H04W 64/00; H04W 72/0453; H04W 76/025; H04L 5/0007; H04L 5/001; H04L 5/0053; H04L 1/0025; H04L 1/0026
  USPC ................. 370/336, 281, 329, 328, 252, 331; 455/266, 552, 78, 509
  See application file for complete search history.

(56) References Cited

U.S. PATENT DOCUMENTS

| | | | |
|---|---|---|---|
| 5,881,369 A | 3/1999 | Dean et al. | |
| 6,405,025 B1 * | 6/2002 | Keski-Mattinen | ............ 455/266 |
| 6,459,905 B1 * | 10/2002 | Fuji | ............ 455/552.1 |

(Continued)

FOREIGN PATENT DOCUMENTS

EP    1261142 A1    11/2002

OTHER PUBLICATIONS

Device-to-Device Communication Underlaying Cellular Communications Systems, Janis et al., 2009.*

(Continued)

*Primary Examiner* — Un C Cho
*Assistant Examiner* — Oussama Roudani
(74) *Attorney, Agent, or Firm* — Slater & Matsil, L.L.P.

(57) ABSTRACT

A system and method for device-to-device (D2D) communication is disclosed. A preferred embodiment comprises a frequency synthesizer configured to provide a first carrier frequency and a second carrier frequency, an up-converter coupled to the frequency synthesizer and configured to up-convert a first baseband signal into a cellular uplink signal when receiving the first carrier frequency from the frequency synthesizer, and configured to up-convert the first baseband signal into a first device-to-device signal when receiving the second carrier frequency from the frequency synthesizer, and a down-converter coupled to the frequency synthesizer and configured to down-convert a second device-to-device signal into a second baseband signal when receiving the first carrier frequency from the frequency synthesizer, and configured to down-convert a cellular downlink signal into the second baseband signal when receiving the second carrier frequency from the frequency synthesizer.

13 Claims, 12 Drawing Sheets

(51) Int. Cl.
 *H04B 7/155* (2006.01)
 *H04B 1/00* (2006.01)

(56) References Cited

U.S. PATENT DOCUMENTS

| | | |
|---|---|---|
| 6,823,187 B2 | 11/2004 | Hamabe |
| 7,526,018 B2 | 4/2009 | Seo et al. |
| 7,734,292 B2 | 6/2010 | Cho et al. |
| 7,831,203 B2 | 11/2010 | Lee et al. |
| 2009/0010185 A1 | 1/2009 | Li et al. |
| 2010/0142416 A1* | 6/2010 | Kim .................. 370/281 |
| 2010/0261469 A1 | 10/2010 | Ribeiro et al. |
| 2011/0255450 A1 | 10/2011 | Wang et al. |
| 2012/0099540 A1* | 4/2012 | Doppler et al. ........... 370/329 |
| 2013/0170398 A1 | 7/2013 | Kwon |
| 2013/0170414 A1 | 7/2013 | Kwon |

OTHER PUBLICATIONS

IEEE Standard for Information technology—Telecommunications and Information exchange between systems—Local and metropolitan area netwoks—Specific requirements, Part 11: Wireless LAN Medium Access Control (MAC) and Physical Layer (PHY) Specifications, IEEE Std 802.11$^{tm}$-2007, Jun. 12, 2007, 1,232 pages.
Fitzek, F.H.P., et al.,"Cellular Controlled Short-Range Communicatio for Cooperative P2P Networking," Wireless Personal Communications, vol. 48, No. 1, Jan. 26, 2008, 5 pages.
Janis, P., et al., "Interference-aware resource allocation for device-to-devive radio underlaying cellular networks," IEEE, 2009, pp. 1-5.
Wu, X., et al.,"FlashlinQ: A Synchronous Distributed Scheduler for Peer-to-Peer Ad Hoc Neworks," Forty-Eighth Annual Allerton Conference, Allerton House, UIUC, Sep. 29-Oct. 1, 2010, pp. 514-521.
International Search Report and Written Opinion in Application No. PCT/US2013/028638, dated Sep. 30, 2013, 12 pages.

* cited by examiner

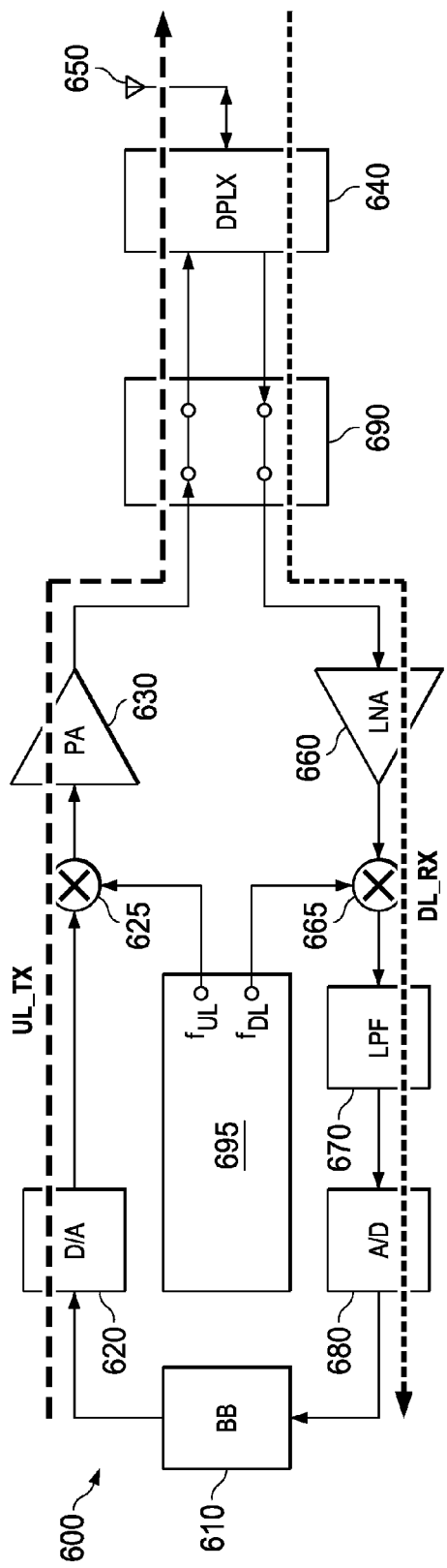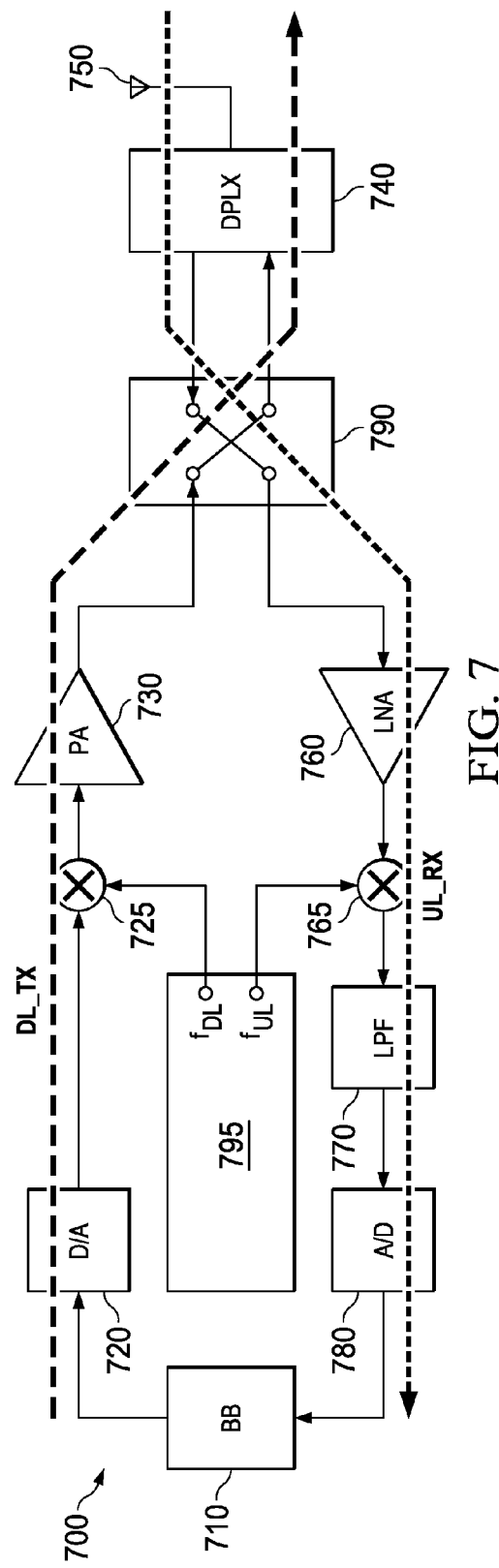

COMPACT TRANSCEIVER ARCHITECTURE FOR ACHIEVING DEVICE TO DEVICE (D2D) COMMUNICATION USING UPLINK AND DOWNLINK CARRIER FREQUENCIES

TECHNICAL FIELD

The present invention relates generally to a transceiver architecture for device-to-device (D2D) communication.

BACKGROUND

In the field of wireless communication, there has been increasing demand for direct device-to-device (D2D) communication. Direct D2D communication refers to a communication mode between a pair of user equipments (UEs) that does not include a base station in a communication path between the UEs. Hence, direct D2D communication differs from traditional cellular communication in that a pair of UEs (e.g., cell phones, etc.) communicate with one another directly, rather than relaying the wireless signal through an intermediate cellular infrastructure (e.g., cell towers, etc.). Direct D2D communication has many practical advantageous over traditional cellular communication. For instance, D2D communication may potentially allow a cellular network to offload a portion of its base station traffic, as well as allow more efficient data transfer to peripheral devices, e.g., printers, cameras, personal computers (PCs), etc. In addition to these and other practical advantages, direct D2D communication may facilitate various proximity based activities and/or functions. For instance, direct D2D communication may allow users to locate nearby friends through proximity based peer identification, as well as allow local businesses to broadcast proximity-based advertisements.

For these and other reasons, direct D2D communication is likely to be adopted in one form or another by future wireless communication standards, such as the Third Generation Partnership Project (3GPP) long term evolution (LTE) Release 12. As such, any design architectures that would reduce the cost of implementing direct D2D signaling in next generation wireless communication devices is desirable.

SUMMARY OF THE INVENTION

Technical advantages are generally achieved by preferred embodiments of the present invention which provide systems and methods for D2D communication.

In accordance with an embodiment, an apparatus for direct device-to-device communication may comprise a frequency synthesizer, a transmission circuit, and a reception circuit. The frequency synthesizer may be configured to provide a first carrier frequency and a second carrier frequency. The transmission circuit may comprise the up-converter and may be configured to generate a cellular uplink signal when the up-converter receives the uplink carrier frequency, and may be further configured to generate a first device-to-device signal when the up-converter receives the downlink carrier frequency. The reception circuit may comprise the down-converter and may be configured to receive a second device-to-device signal when the down-converter receives the uplink carrier frequency, and may be further configured to receive a cellular downlink signal when the down-converter receives the downlink carrier frequency.

In accordance with yet another embodiment, an apparatus may comprise a frequency synthesizer, an up-converter coupled to the frequency synthesizer, and a down-converter coupled to the frequency synthesizer. The frequency synthesizer may be configured to provide a first carrier frequency and a second carrier frequency. The up-converter may be configured to up-convert a first baseband signal into a cellular uplink signal when receiving the first carrier frequency from the frequency synthesizer, and may be further configured to up-convert the first baseband signal into a first device-to-device signal when receiving the second carrier frequency from the frequency synthesizer. The down-converter may be configured to down-convert a second device-to-device signal into a second baseband signal when receiving the first carrier frequency from the frequency synthesizer, and may be further configured to down-convert a cellular downlink signal into the second baseband signal when receiving the second carrier frequency from the frequency synthesizer.

In accordance with yet another embodiment, a method for device-to-device communication may comprise generating a cellular uplink signal using a serially connected up-converter and power-amplifier during a first time period of a time division multiplexing (TDM) scheme synchronization window. The method may further comprise generating a first device-to-device signal using the serially connected up-converter and power-amplifier during a second time period of the TDM synchronization window. The method may further comprise receiving a cellular downlink signal using a serially connected down-converter and low-noise-amplifier during the first time period of the TDM synchronization window. The method may further comprise receiving a first device-to-device signal using the serially connected down-converter and low-noise-amplifier during the second time period of the TDM synchronization window.

In accordance with yet another embodiment, an apparatus comprising an up-converter coupled to an output port of a baseband processor, a power amplifier connected in series with the up-converter and the output port of the baseband processor, the up-converter positioned between the power amplifier and the baseband processor, and a switch comprising a first port that is coupled in series with the power amplifier, the up-converter, and the output port of the baseband processor.

In accordance with yet another embodiment, an apparatus may comprise a down-converter coupled to an input port of a baseband processor and a low-noise amplifier connected in series with the down-converter and the input port of the baseband processor, where the down-converter is positioned between the low-noise amplifier and the first port of the baseband processor. The apparatus may further comprise a switch comprising a first port connected in series with the low-noise amplifier, the down-converter, and the input port of the baseband processor.

Various embodiments may provide many practical and technical advantages. For instance, the transceiver architecture may re-use certain transceiver components, thereby allowing the transceiver architecture to be smaller/more compact), less costly to manufacture, as well as achieve reduced power consumption through the use of fewer amplifiers. Other advantages of the inventive subject matter disclosed herein will become apparent upon reviewing the detailed description and claims below.

BRIEF DESCRIPTION OF THE DRAWINGS

For a more complete understanding of the present invention, and the advantages thereof, reference is now made to the following descriptions taken in conjunction with the accompanying drawings, in which:

FIG. 6 illustrates a circuit diagram of the first embodiment of a transceiver architecture at a first time period of a synchronization window;

FIG. 7 illustrates a circuit diagram of the first embodiment of a transceiver architecture at a second time period of a synchronization window;

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a remediation process for wireless nodes. The invention may also be applied, however, to other remediation processes and recovery of validation failure events.

One interesting aspect of direct D2D communications is how much control will be retained by the cellular providers. Although direct D2D communication could theoretically occur without facilitation by the cellular service providers, cellular operators may generally desire to monitor and/or control various aspects of direct D2D communications for purposes of billing and accounting, management of carrier frequencies and interference, and overall management of network traffic to optimize available bandwidths. One technique for accomplishing this is to establish cellular links (i.e., links between the UEs and a wireless base station) in addition to the D2D links (i.e., the links extending between the pair of UEs).

Figure 1:
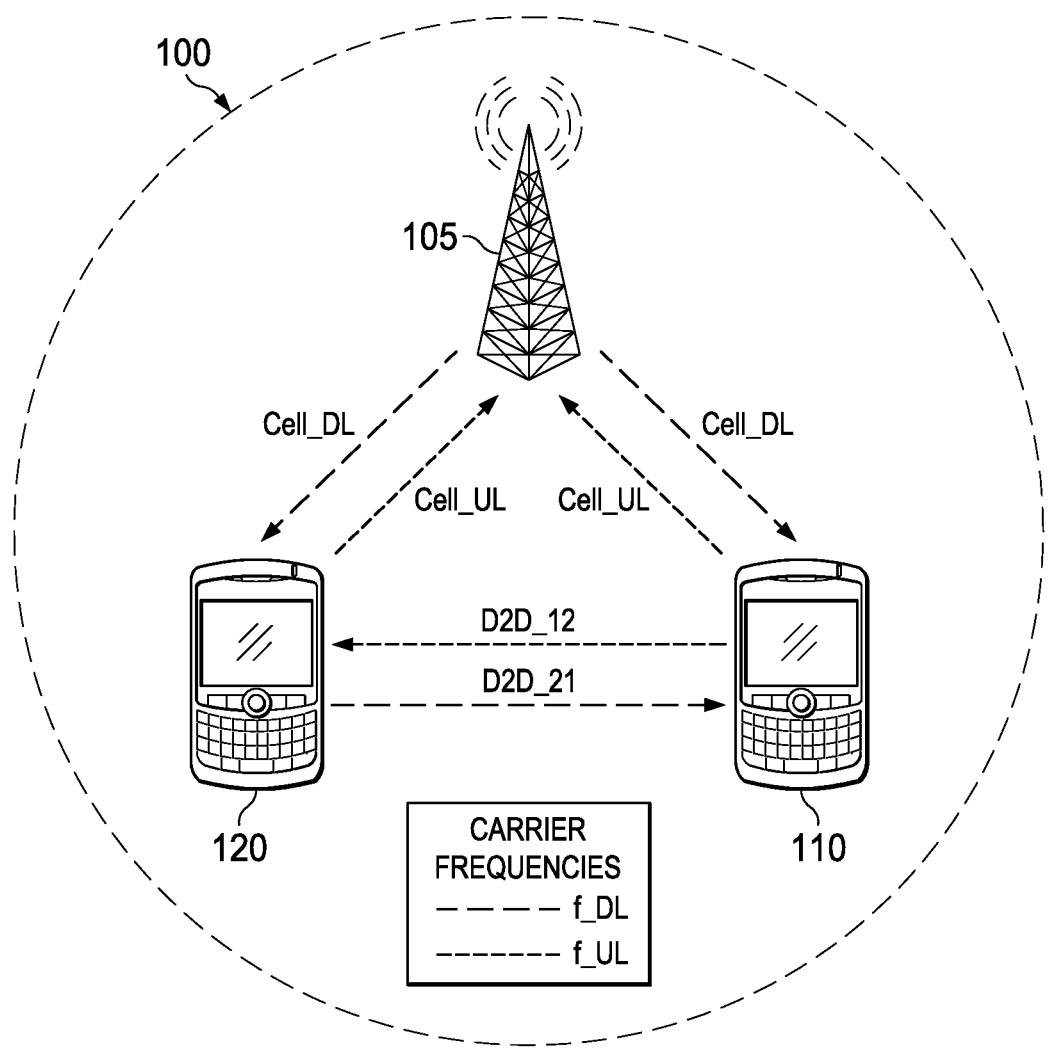
FIG. 1 illustrates a wireless network for establishing direct D2D communication.

FIG. 1 illustrates a wireless network 100 for establishing direct D2D communication. The wireless network 100 comprises an evolved base station (eNB) 105 and a pair of UEs 110-120. As used herein, the term UE may refer to any peer mobile device that allows a user to communicate wirelessly with a base station or another communications device, while the term eNB may refer to any wireless device or component (e.g., base station, cell tower, etc.) that is capable of establishing and/or facilitating the establishment of wireless communication between two or more UEs. Oftentimes, eNBs will be operated by, or under the control of, a wireless service provider, and hence may allow the wireless service provider to monitor and/or control various aspects of a Direct D2D communication between a pair of UEs. The UE 110 may establish a first D2D link (D2D_12 link) with the UE 120, which may allow the UE 110 to transmit data directly to the UE 120. Likewise, the UE 120 may establish a second D2D link (D2D_21 link) with the UE 110, which may allow the UE 120 to transmit data directly to the UE 110. Hence, the D2D_12 and the D2D_21 may allow the UEs 110 and 120 to engage in bi-directional wireless communication directly with one another. One example of a technique for establishing D2D links is discussed in co-pending U.S. Non-Provisional patent application Ser. No. 13/343,585 entitled "System and Method for Device Discovery for Device-to-Device Communication in a Cellular Network," filed Jan. 4, 2012, which is incorporated herein by reference as if reproduced in its entirety.

Additionally, one or both of the UEs 110, 120 may establish a cellular uplink (Cell_UL) connection with the eNB 105, thereby allowing the wireless service provider to monitor various aspects of the direct D2D communication. Likewise, the eNB 105 may establish a cellular downlink (Cell_DL) connection with one or both of the UEs 110-120, thereby allowing the wireless service provider to control various aspects of the direct D2D communication.

As such, the D2D communication may include 4 links/connections: the D2D_12 connection, the D2D_21 connection, the Cell_UL connection, and the Cell_DL connection. The Cell_UL and Cell_DL connections may be frequency division duplexed (FDD) such that the CELL_UL connection uses a cellular uplink carrier frequency (f_UL) and the CELL_DL connection uses a cellular downlink carrier frequency (f_DL). The f_UL and f_DL may be orthogonal such that there is little or no interference between them. The D2D_12 and D2D_21 connections may share carrier frequencies with their cellular counterparts according to a time division multiplexing (TDM) scheme. Specifically, the D2D_12 may share the f_UL with the Cell_UL, while the D2D_21 may share the f_DL with the Cell_DL. The technique of using both FDD and TDM techniques to manage the D2D and cellular signals may be referred to herein as 'the proposed cellular and D2D operation mode.' The proposed cellular and D2D operation mode is described in co-pending U.S. Non-Provisional patent application Ser. No. 13/343,554 entitled "System and Method for Device-to-Device Communication Overlaid on a Cellular Network," filed Jan. 4, 2012, which is incorporated herein by reference as if reproduced in its entirety.

Figure 2:
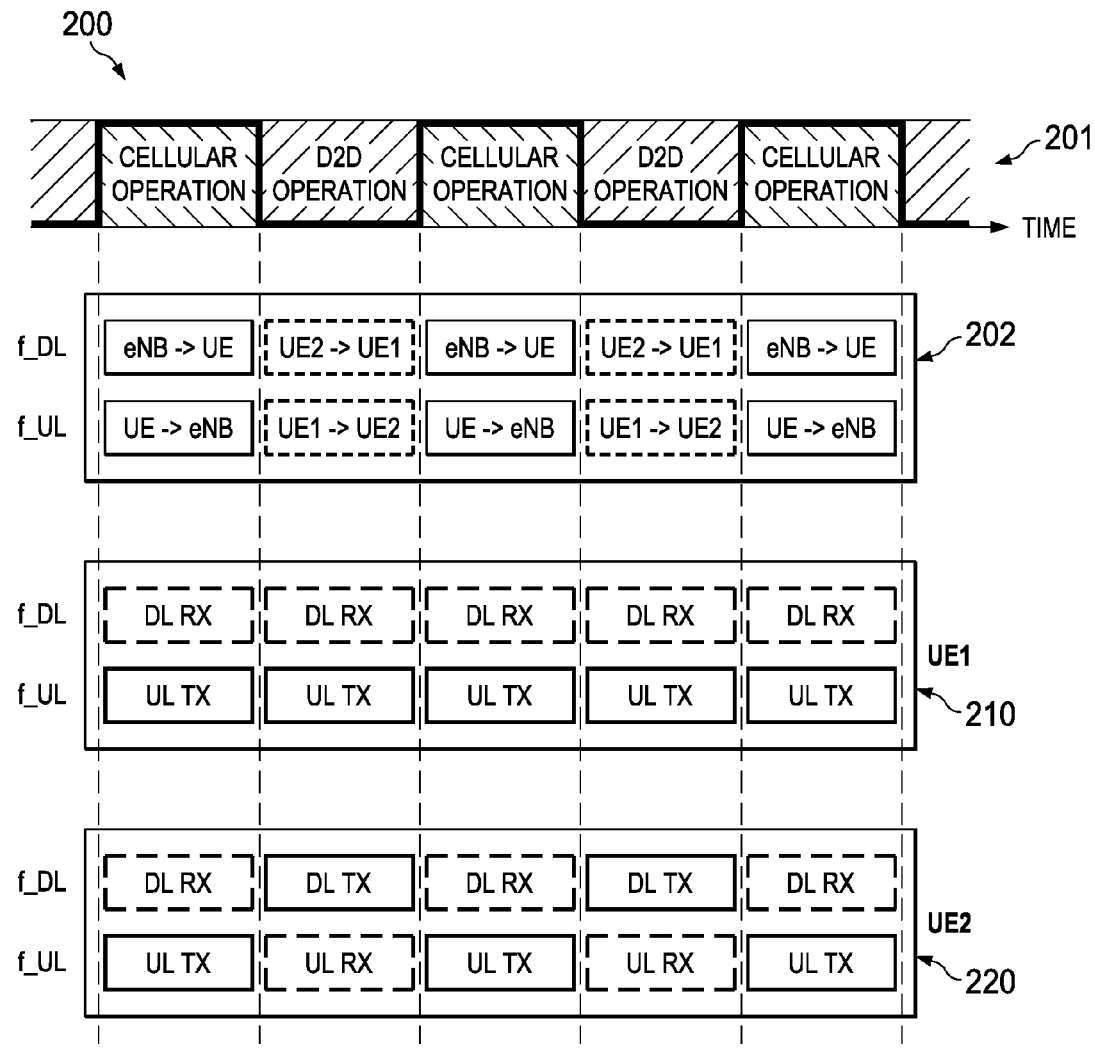
FIG. 2 illustrates a diagram of a frequency allocation for a cellular and D2D operation mode.

FIG. 2 illustrates a diagram 200 of a frequency allocation for the proposed cellular and D2D operation mode. Specifically, the diagram 200 depicts a TDM window 201, a network transmission indicator 202, a first UE mode (UE1) 210, and a second UE mode (UE2) 220. The UE1 210 and the UE2 220 may correspond to modes for the UE 110 and the UE 120 (respectively). Notably, the TDM window 201 and the network transmission indicator 202 may correspond to a TDM switching cycle of UE1 and UE2, but may not dictate or affect TDM switching cycles of other UEs in the network. Further, the TDM window 201 may not directly limit the eNB's operation because the eNB may engage in cellular communication with other UEs during the D2D operation periods of the TDM window 201. As shown by the UE2 220, the UE 120 may need to receive and transmit on both f_DL and f_UL, thereby requiring the UE 120 to navigate between four operation modes. These modes include: (1) receiving a cellular signal from the eNB 105 at f_DL (referred to herein as the "DL_RX mode"); (2) transmitting a D2D signal to the UE2 120 at f_DL (referred to herein as the "DL_TX mode"); (3) transmitting a cellular signal to the eNB 105 at f_UL (referred to herein as the "UL_TX mode"); and (4) receiving a D2D signal from the UE2 120 at f_UL (referred to herein as the "UL_RX mode").

Figure 3:
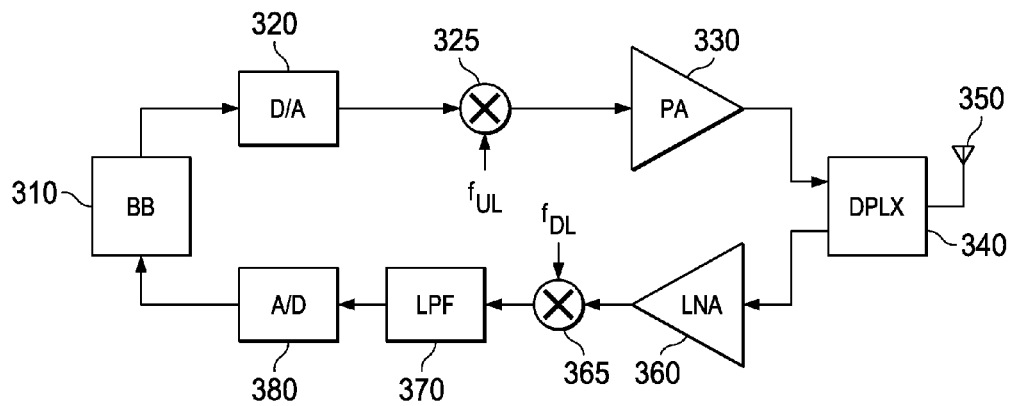
FIG. 3 illustrates a circuit diagram of a conventional transceiver architecture for traditional cellular communication.

One solution for designing a transceiver architecture that can operate in each of the four modes is to simply expand on the conventional cellular FDD transceiver architecture. FIG. 3 illustrates a conventional transceiver architecture 300, which may be employed in traditional cellular communications utilizing FDD. As shown, the conventional transceiver architecture 300 may comprise a baseband (BB) processor 310, a digital to Analog (D/A) converter 320, an f_UL up-converter 325, a power amplifier (PA) 330, a duplexer (DPLX) 340, an antenna 350, a low noise amplifier (LNA) 360, an f_DL down-converter 365, a low pass filter (LPF) 370, and an Analog to digital (A/D) converter 380. The BB processor 310 may be any component capable of generating and/or processing a digital low frequency signal (e.g., line coded signal), which may be referred to herein as a digital baseband signal. The D/A converter 320 may be any component capable of converting a digital baseband signal into a corresponding analog baseband signal. The f_UL up-converter 325 may be any component capable of up-converting the analog baseband signal into an equivalent signal having the f_UL, such as the Cell_UL signal. The PA 330 may be any component capable of amplifying or increasing the gain of the Cell_UL signal. The DPLX 340 may be any component capable of isolating one carrier frequency from another carrier frequency. The antenna 350 may be any component capable of converting an electrical signal into a corresponding radio wave (or vice versa). The LNA 360 may be any component capable of amplifying or increasing the gain of an electrical signal, and (in some embodiments) may do so while minimizing the amount of noise added during amplification. The f_DL down-converter 365 may be any component capable of down-converting a higher frequency signal (e.g., a Cell_DL signal) into a lower frequency signal (e.g., an analog baseband signal). The A/D converter 380 may be any component capable of converting an analog baseband signal into a digital baseband signal.

The conventional transceiver architecture 300 may facilitate that transmission of a Cell_UL signal according to the following steps; (1) the BB processor 310 may generate a digital baseband signal, (2) the D/A converter 320 may convert the digital baseband signal into an analog baseband signal, (3) the f_UL up-converter 325 may up-convert the analog baseband signal into a Cell_UL signal; (4) the PA 330 may amplify the Cell_UL signal; (5) the DPLX 340 may isolate the Cell_UL signal from any received signals (such as a Cell_DL signal); and (6) the antenna 350 may convert the Cell_UL signal into an equivalent radio signal, thereby transmitting the Cell_UL signal.

The conventional transceiver architecture 300 may facilitate the reception of a Cell_DL signal according to the following steps: (1) the antenna 350 may receive Cell_DL radio signal, and convert the Cell_DL radio signal into an equivalent electrical signal; (2) the DPLX 340 may isolate the Cell_DL signal from any transmission signals (such as the Cell_UL signal); (3) the LNA 360 may amplify the Cell_DL signal; (4) the f_DL down-converter 365 may down-convert the Cell_DL signal into an analog baseband signal; (5) the LPF 370 may filter the analog baseband signal to remove hi-frequency components (e.g., high frequency noise); (6) the A/D converter 380 may convert the analog baseband signal into a digital baseband signal; and (7) the BB processor 310 may process the digital baseband signal accordingly.

Figure 4:
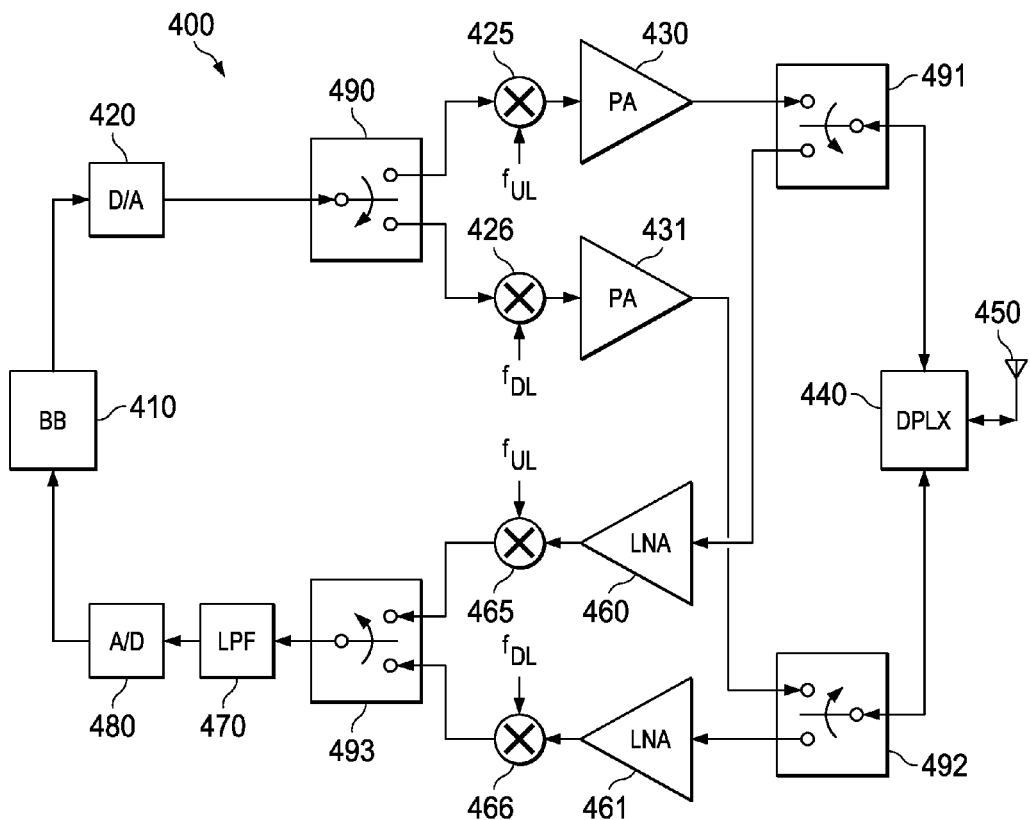
FIG. 4 illustrates a circuit diagram of a conventional transceiver architecture for achieving direct D2D functionality.

Direct D2D communication functionality (e.g., according to the proposed operation mode discussed above) may be achieved by simply expanding on the conventional transceiver architecture 300. FIG. 4 illustrates a conventional transceiver architecture 400 for achieving direct D2D functionality. The conventional transceiver architecture 400 may comprise a BB processor 410, a D/A converter 420, an f_UL up-converter 425, an f_DL down-converter 426, a pair of PAs 430-431, a DPLX 440, an antenna 450, a pair of LNAs 460-461, an f_UL down-converter 465, an f_DL down-converter 466, an LPF 470, an A/D converter 480, and a plurality of switches 490-493. The components 410-480 may function in a somewhat similar manner to the corresponding components 310-380 discussed above. The switches 490-493 may be any devices capable of switching between two electrical circuits or pathways.

The conventional transceiver architecture 400 may be capable of transmitting both a Cell_UL signal (at the f_UL) and a D2D_21 signal (at the f_DL) by alternating between the f_UL up-converter 425 and the f_DL up-converter 426 using the switch 490. Likewise, conventional transceiver architecture 400 may be capable of receiving both a Cell_DL signal (at the f_DL) and a D2D_12 signal (at the f_UL) by alternating between the f_DL down-converter 466 and the f_UL up-converter 465 using the switch 493. The switches 491 and 492 may allow the respective cellular and D2D signals to be appropriately routed to the DPLX 440.

Notably, the conventional transceiver architecture 400 must include several additional components to achieve direct D2D communication, including an additional PA, an additional LNA, an additional down-converter, and an additional up-converter. These additional components may significantly increase the complexity of the transceiver, which may increase the cost of bringing the product to market. As such, a less-complex D2D capable transceiver architecture (e.g., including fewer and/or cheaper components) is desirable.

An embodiment of a transceiver architecture for achieves direct D2D functionality using fewer components and/or less-complex circuit architectures. Specifically, the transceiver architecture may efficiently reuse one or more RF components (e.g., PAs, LNAs, up-converters, etc.) when achieving direct D2D functionality. As such, mobile devices that adopt the transceiver architecture may be smaller (e.g., more compact), less expensive, and/or experience reduced power consumption (e.g., through the use of fewer amplifiers).

Figure 5:
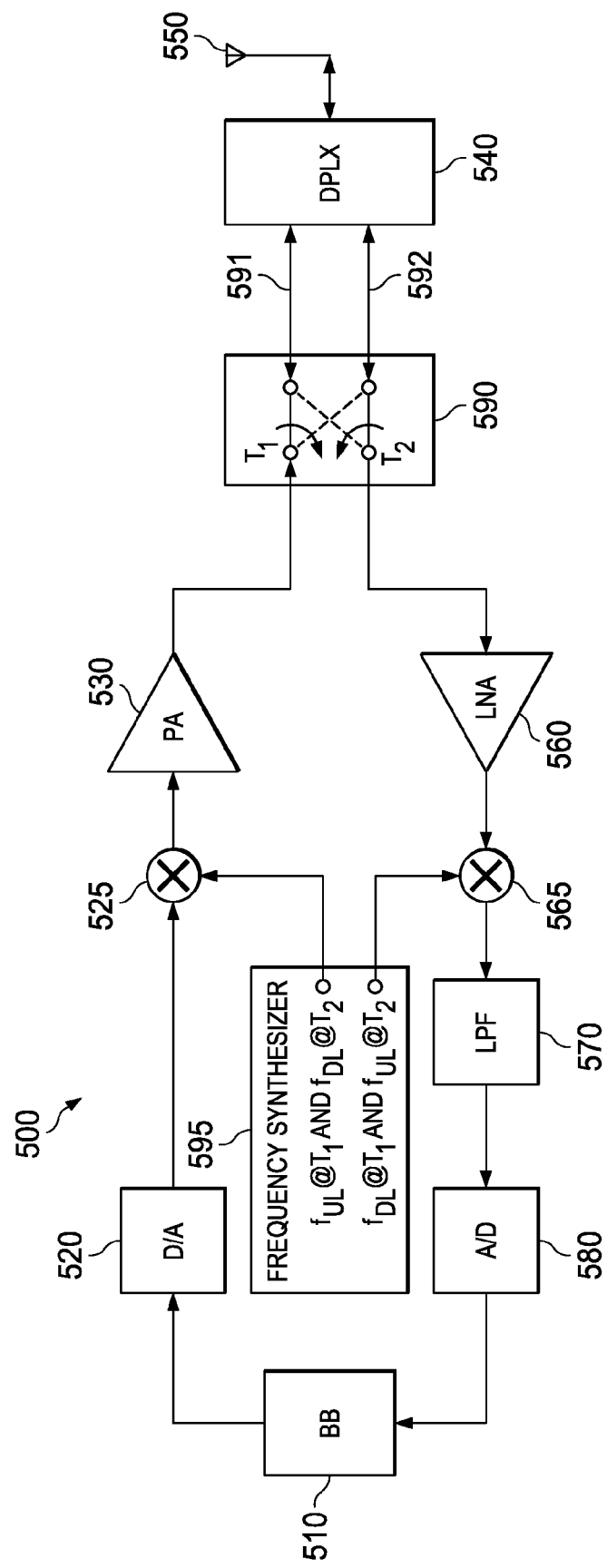
FIG. 5 illustrates a circuit diagram of a first embodiment of a transceiver architecture for achieving direct D2D functionality.

FIG. 5 illustrates one embodiment of a transceiver architecture 500 for achieving direct D2D functionality. The transceiver architecture 500 may comprise a BB processor 510, a D/A converter 520, an up-converter 525, a PA 530, a DPLX 540, an antenna 550, an LNA 560, a down-converter 565, an LPF 570, an A/D converter 580, a switch 590, and a frequency synthesizer 595. The BB processor 510, the D/A converter 520, the PA 530, the DPLX 540, the antenna 550, the LNA 560, the LPF 570, and the A/D converter 580 may be configured somewhat similarly to the corresponding components 310-380 discussed above. In an embodiment, the PA 530 and the LNA 560 may comprise wideband functionality, meaning that they are capable of processing signals of various frequencies. The DPLX 540 may be capable of separating two frequency bands (e.g., f_DL and f_UL frequency bands) in both cellular and D2D operation modes. In other words, the DPLX 540 may have the capability of processing f_UL signals and f_DL signals on both the reception and transmission paths. In some embodiments, the serially connected up-converter 525 and PA 530 may be referred to as a transmission circuit, while the serially connected LNA 560 and down-converter 565 may be referred to as a reception circuit. In the same or other embodiments, the transmission circuit may further include the D/A converter 520, while the reception circuit may further include the LPF 570 and/or the A/D converter 580. In some embodiments, multi-component configurations, such as those illustrated in FIGS. 14 and 15, may replace the LNA 560, the PA 530, or both.

The up-converter 525 may function somewhat similarly to the f_UL up-converter 325, except that the up-converter 525 may be capable of up-converting a baseband analog signal into multiple different carrier frequencies (e.g., as provided by the frequency synthesizer 595), rather than to just a single carrier frequency. For instance, up-converter 525 may up-convert the baseband analog signal into an f_DL signal (e.g., the D2D_21 signal) when the frequency synthesizer 595 provides an f_DL, or to an f_UL signal (e.g., Cell_UL signal) when the frequency synthesizer 595 provides an f_UL. Likewise, the down-converter 565 may function somewhat similarly to the f_DL down-converter 365, except that the down-converter 565 may be capable of down-converting different carrier frequencies to the baseband signal (e.g., pursuant to a signal provided by the frequency synthesizer 595). For instance, down-converter 565 may be configured to down-convert an f_DL carrier signal (e.g., Cell_DL signal) when the frequency synthesizer 595 provides an f_DL, or to down-convert an f_UL carrier signal (e.g., D2D_12 signal) when the frequency synthesizer 595 provides an f_UL.

The switch 590 may be similar to the switch 490, except that the switch 590 may be a four way switch. The frequency synthesizer 595 may be any component configured to generate or otherwise provide corresponding carrier frequencies to the up-converter 525 and/or the down-converter 565. In an embodiment, the switch 590 and the frequency synthesizer 595 may provide TDM functionality, thereby facilitating the implementation of the proposed cellular and D2D operation mode. For instance, the frequency synthesizer 595 may provide the f_UL signal to the up-converter 525 during a first timeslot (T1) in a TDM window and to the down-converter 565 at a second timeslot (T2) in the TDM window. Likewise, the frequency synthesizer 595 may provide the f_DL signal to the up-converter 525 during T2 and to the down-converter 565 at a T1. The switch 590 may be configured to ensure that the D2D_21 signal received from the PA 530 is output on the link 592, and that the Cell_UL signal received from the PA 530 is output on the link 591. Likewise, the switch 590 may be configured to ensure that the Cell_DL and D2D_12 signals received from the DPLX 540 are forwarded to the LNA 560. This concept is better described by FIGS. 6 and 7.

FIG. 6 illustrates a transceiver architecture 600, which corresponds to the transceiver architecture 500 at T1. The transceiver architecture 600 comprises a BB processor 610, a D/A converter 620, an up-converter 625, a PA 630, a DPLX 640, an antenna 650, an LNA 660, a down-converter 665, an LPF 670, an A/D converter 680, a switch 690, and a frequency synthesizer 695, which may be configured similarly to the corresponding components 510-595 in FIG. 5. At the time T1, the frequency synthesizer 695 may provide an f_UL signal to the up-converter 625 and an f_DL signal to the down-converter 665. Likewise, the switch 690 may ensure that the Cell_UL signal is output on the link 691, and that the received Cell_DL signal is forwarded to the LNA 660. Hence, the frequency synthesizer 695 may allow the up-converter 625 to produce the Cell_UL signal (for transmission), as well as allow the down-converter 665 to down-convert the received Cell_DL signal, while the switch 690 may ensure that the respective signals are correctly routed to the DPLX 640.

FIG. 7 illustrates a transceiver architecture 700, which corresponds to the transceiver architecture 500 at T2. The transceiver architecture 700 comprises a BB processor 710, a D/A converter 720, an up-converter 725, a PA 730, a DPLX 740, an antenna 750, an LNA 760, a down-converter 765, an LPF 770, an A/D converter 780, a switch 790, and a frequency synthesizer 795, which may be configured similarly to the corresponding components 510-595 in FIG. 5. The frequency synthesizer 795 may provide an f_DL signal to the up-converter 725, and provide an f_UL signal to the down-converter 765. Likewise, the switch 790 may ensure that the D2D_21 signal is output on the link 792, and that the D2D_12 signal is forwarded to the LNA 760. Hence, the frequency synthesizer 795 may allow the up-converter 725 to produce the D2D_21 signal (for transmission), as well as allow the down-converter 765 to down-convert the received D2D_12 signal, while the switch 790 may ensure that the respective signals are correctly routed to the DPLX 740.

Figure 8:
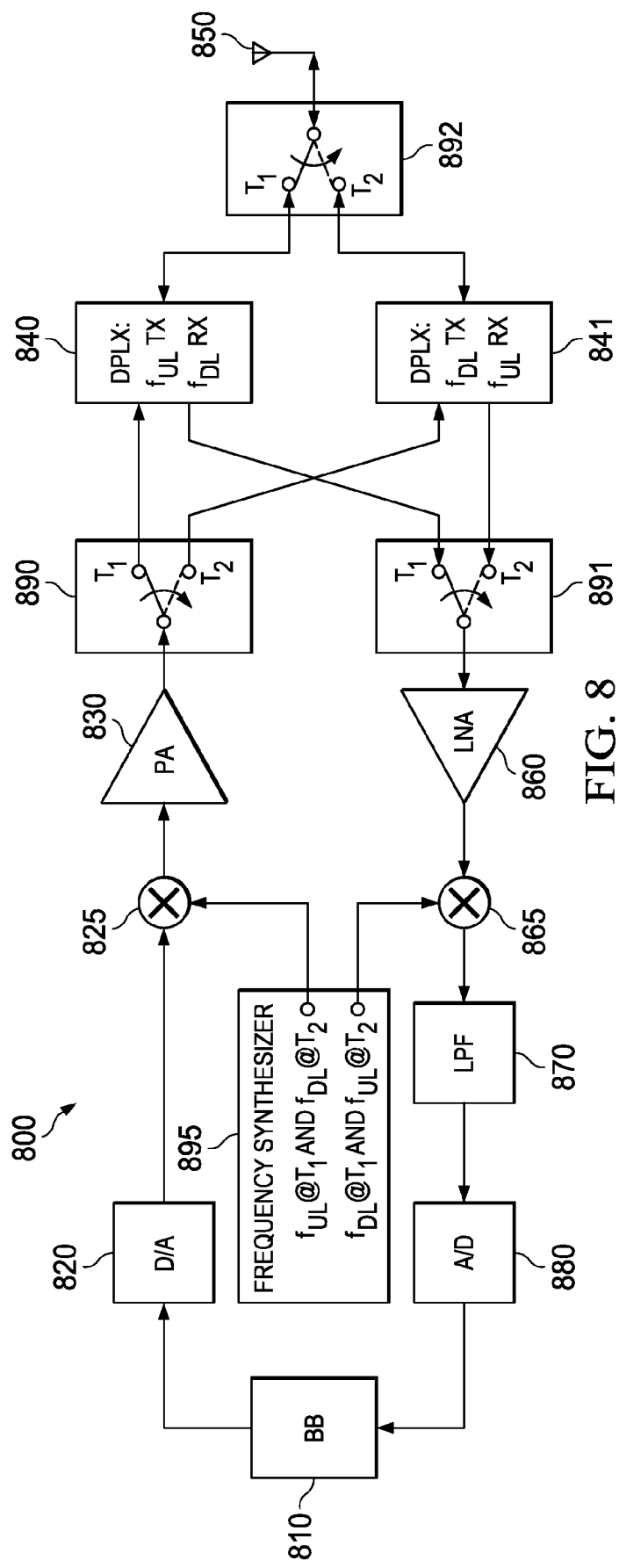
FIG. 8 illustrates a circuit diagram of a second embodiment of a transceiver architecture for achieving direct D2D functionality.

FIG. 8 illustrates a transceiver architecture 800 for achieving direct D2D functionality, which may be an alternative embodiment to the transceiver architecture 500. The transceiver architecture 800 may comprise a BB processor 810, a D/A converter 820, an up-converter 825, a PA 830, a pair of DPLXs 840-841, an antenna 850, an LNA 860, a down-converter 865, an LPF 870, an A/D converter 880, a plurality of switches 890-892, and a frequency synthesizer 895. The BB processor 810, the D/A converter 820, the up-converter 825, the PA 830, the antenna 850, the LNA 860, the down-converter 865, the LPF 870, the A/D converter 880, and the frequency synthesizer 895 may be configured somewhat similarly to the corresponding components 510-595 of the transceiver architecture 500. In some embodiments, the serially connected up-converter 825 and PA 830 may be referred to as a transmission circuit, while the serially connected LNA 860 and down-converter 865 may be referred to as a reception circuit. In the same or other embodiments, the transmission circuit may further include the D/A converter 820, while the reception circuit may further include the LPF 870 and/or the A/D converter 880. In some embodiments, multi-component configurations, such as those illustrated in FIGS. 14 and 15, may replace the LNA 860, the PA 830, or both.

The DPLXs 840 and 841 may be similar to the DPLX 540, except that each of the DPLXs 840 and 841 may support specific transmission (TX) and reception (RX) frequency bands. For instance, the DPLX 840 may support a TX frequency band corresponding to f_UL and an RX frequency band corresponding to f_DL, while the DPLX 841 may support a TX frequency band corresponding to f_DL and an RX frequency band corresponding to f_UL.

In some commercial implementations, the transceiver architecture 800 may be preferable over the transceiver architecture 500 because the transceiver architecture 800 may include less complex (e.g., less costly) components. For instance, the DPLX 540 may be more complex than the DPLXs 840-841 by virtue of its ability to support different TX and RX filter requirements. In other commercial implementations, the transceiver architecture 500 may be preferable over the transceiver architecture 800 in that it may comprise fewer components and/or a more streamlined/compact design.

Figure 9:
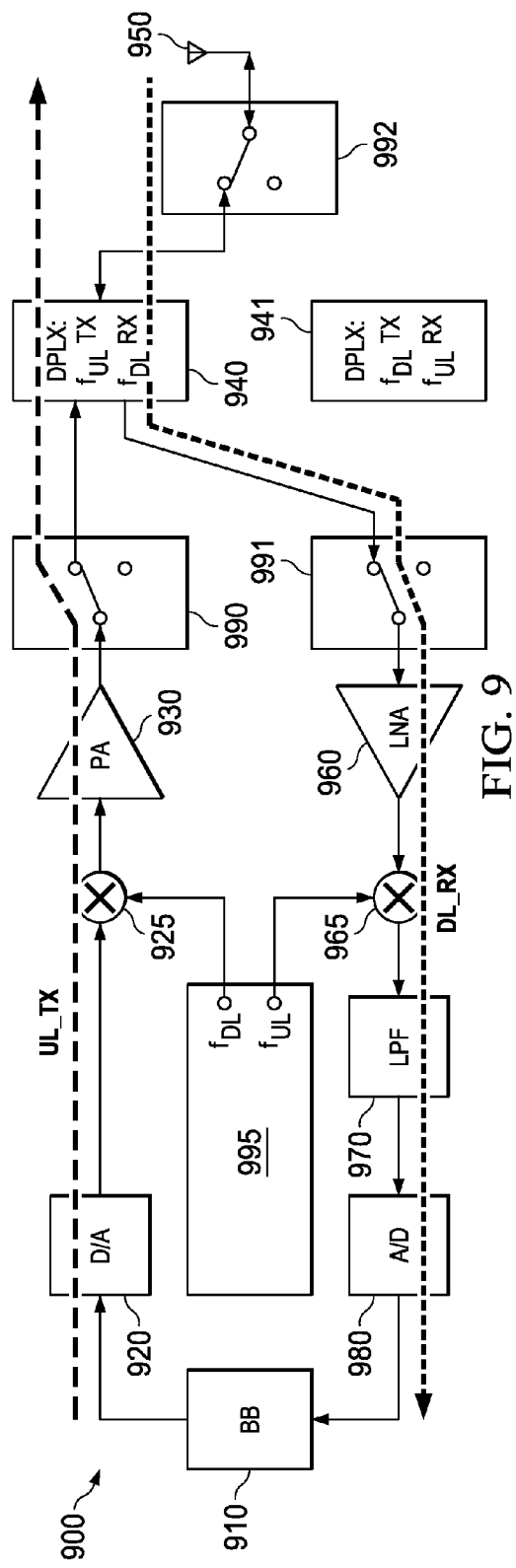
FIG. 9 illustrates a circuit diagram of the second embodiment of a transceiver architecture at a first time period of a synchronization window.
Figure 10:
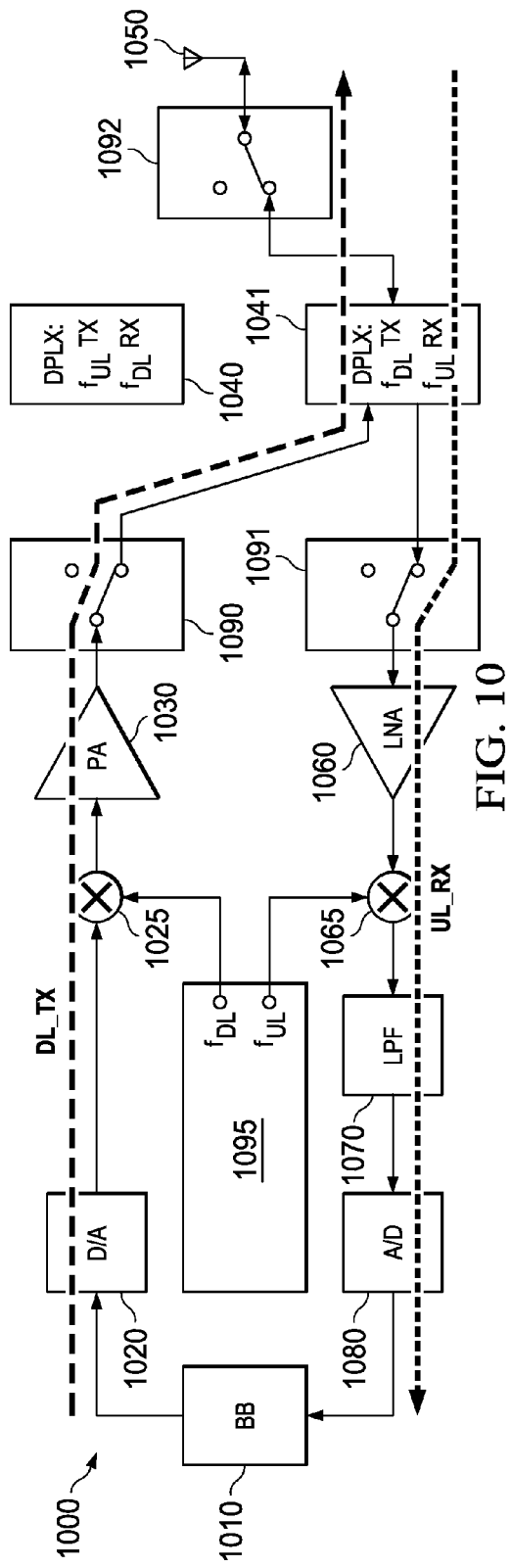
FIG. 10 illustrates a circuit diagram of the second embodiment of a transceiver architecture at a second time period of a synchronization window.

FIGS. 9 and 10 illustrate the operation of the transceiver architecture 800 at T1 and T2, respectively. Specifically, FIG. 9 illustrates a transceiver architecture 900 comprising a BB processor 910, a D/A converter 920, an up-converter 925, a PA 930, a pair of DPLXs 940-941, an antenna 950, an LNA 960, a down-converter 965, an LPF 970, an A/D converter 980, a plurality of switches 990-992, and a frequency synthesizer 995, which may be configured somewhat similarly to the corresponding components 810-895 of the transceiver architecture 800. As shown, the Cell_UL and Cell_DL signals are funneled through the DPLX 940.

FIG. 10 illustrates a transceiver architecture 1000 comprising a BB processor 1010, a D/A converter 1020, an up-converter 1025, a PA 1030, a pair of DPLXs 1040/1041, an antenna 1050, an LNA 1060, a down-converter 1065, an LPF 1070, an A/D converter 1080, a plurality of switches 1090-1092, and a frequency synthesizer 1095, which may be configured somewhat similarly to the corresponding components 810-895 of the transceiver architecture 800. As shown, the D2D_12 and D2D_21 signals are funneled through the DPLX 1041.

Figure 11:
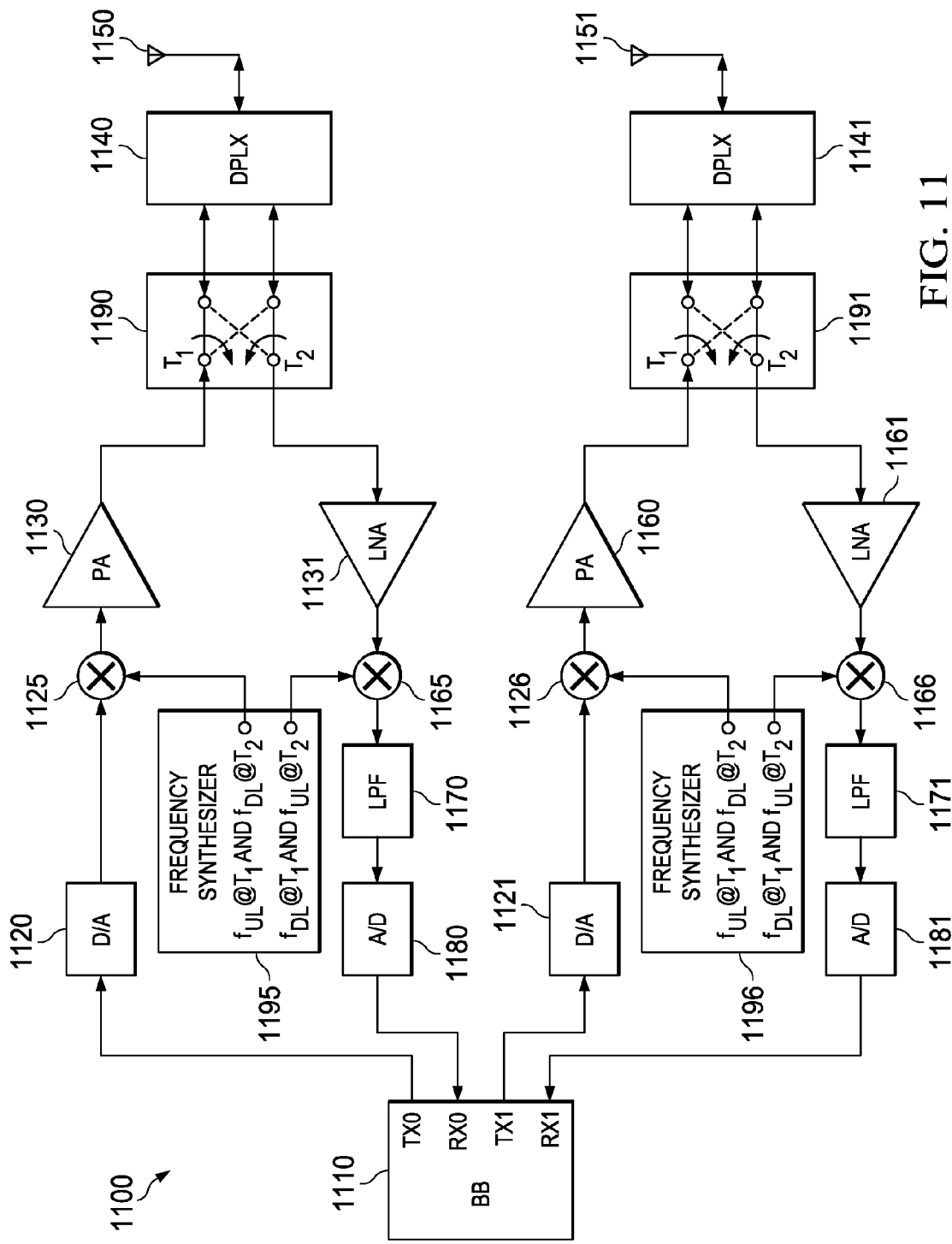
FIG. 11 illustrates a circuit diagram of the first embodiment of a transceiver architecture as modified for use with multiple antennas.
Figure 12:
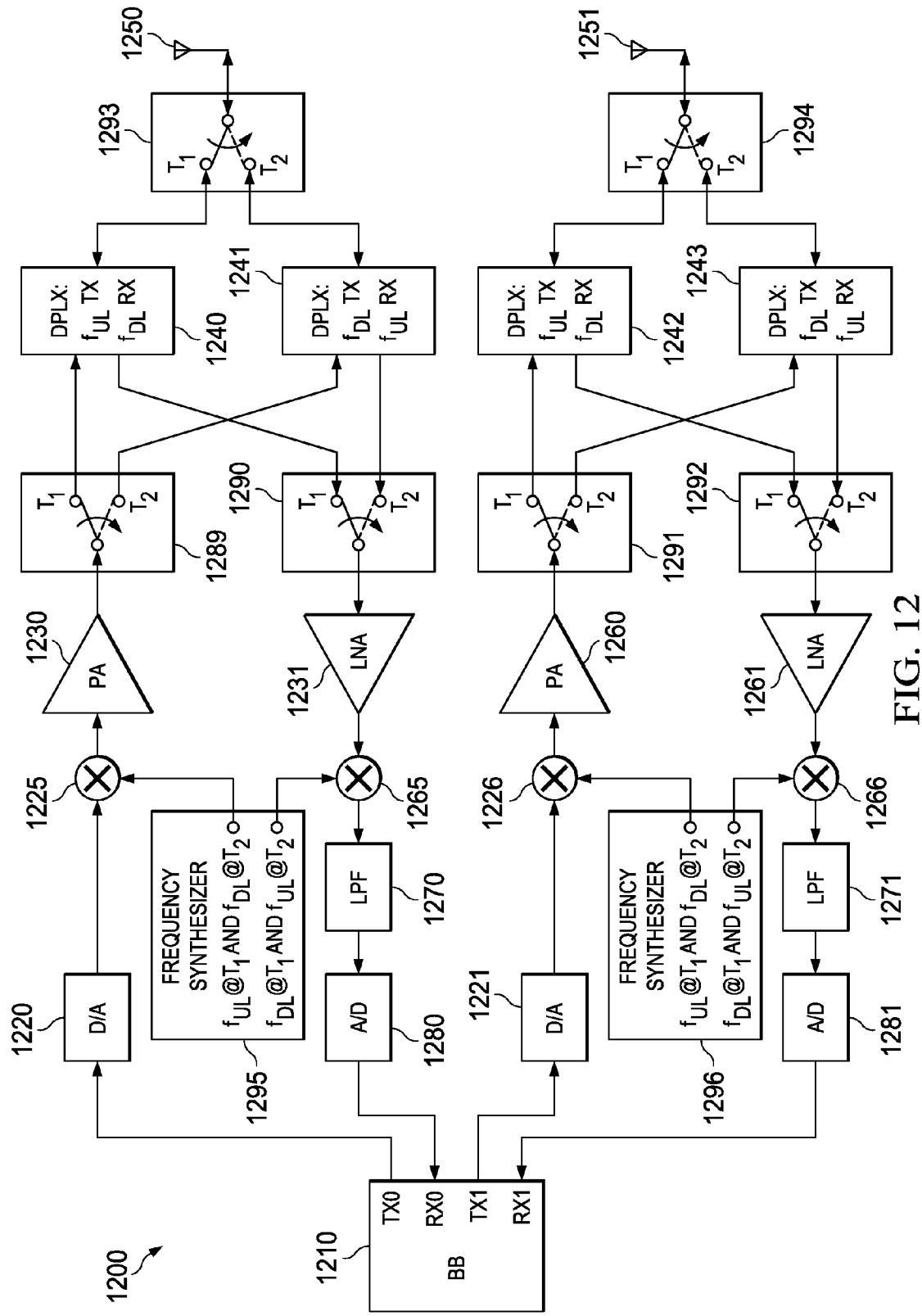
FIG. 12 illustrates a circuit diagram of the second embodiment of a transceiver architecture as modified for use with multiple antennas.

As shown in FIGS. 11 and 12, embodiments may be implemented in multiple antenna applications using multiple-input and multiple-output (MIMO) and/or beamforming. FIG. 11 illustrates a transceiver architecture 1100 that implements aspects of the transceiver architecture 500 in the context of multiple antennas. The transceiver architecture 1100 may comprise a BB processor 1110, a pair of D/A converters 1120-1121, a pair of up-converters 1125-1126, a pair of PAs 1130, 1160, a pair of DPLXs 1140-1141, a pair of antennas 1150-1151, a pair of LNAs 1131, 1161, a pair of down-converters 1165-1166, a pair of LPFs 1170-1171, a pair of A/D converters 1180-1181, a pair of switches 1190-1191, and a pair of frequency synthesizers 1195-1196. The components 1120-1196 may be configured similarly to corresponding components 520-595 of the transceiver architecture 500. The BB processor 1110 may be a four channel processor having a pair of transmission channels (TX0 and TX1) and a pair of reception channels (RX0 and RX1) channels, and hence may manipulate the power sent to the respective antennas 1150 and 1151 to achieve desired results. In some embodiments, the transceiver architectures 1100 may utilize only a single frequency synthesizer in place of the pair of frequency synthesizers 1195-1196, where the single frequency synthesizer would deliver the f_UL and f_DL carrier frequencies to both of the up-converters 1126 and 1127, as well as both of the down-converters 1165 and 1166.

FIG. 12 illustrates a transceiver architecture 1200 that implements aspects of the transceiver architecture 800 in the context of multiple antennas. The transceiver architecture 1200 may comprise a BB processor 1210, a pair of D/A converters 1220-1221, a pair of up-converters 1225-1226, a pair of PAs 1230, 1260, four DPLXs 1240-1243, a pair of antennas 1250-1251, a pair of LNAs 1231, 1261, a pair of down-converters 1265-1266, a pair of LPFs 1270-1271, a pair of A/D converters 1280-1281, a plurality of switches 1289-1294, and a pair of frequency synthesizers 1295-1296. The components 1220-1296 may be configured similarly to corresponding components 820-895 of the transceiver architecture 800. The BB processor 1210 may be a four channel processor having a pair of transmission channels (TX0 and TX1) and a pair of reception channels (RX0 and RX1), and hence may manipulate the power sent to the respective antennas 1150 and 1151 to achieve desired results. In some embodiments, the transceiver architectures 1200 may utilize only a single frequency synthesizer in place of the pair of frequency synthesizers 1295-1296, where the single frequency synthesizer would deliver the f_UL and f_DL carrier frequencies to both of the up-converters 1226 and 1227, as well as both of the down-converters 1265 and 1266.

The concepts illustrated in FIGS. 11-12 can be applied to other multi-channel processors (e.g., six channel BB processors, eight channel BB processors, etc.) that utilize multiple antennas (e.g., three antennas, four antennas, etc.).

Figure 13:
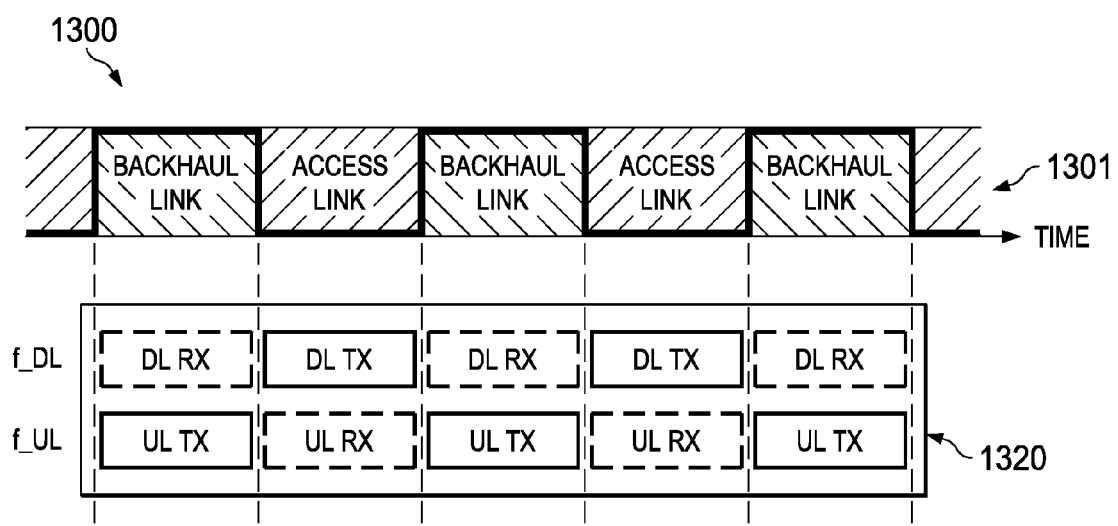
FIG. 13 illustrates a diagram of frequency allocation depicted in FIG. 2 as modified for use in a relay station.

Embodiments may be implemented in a relay station as well. FIG. 13 shows an operation mode 1300 for a relay station using different frequency bands (f_DL and f_UL) for its backhaul and access links. As shown, the operation mode 1300 depicts a TDM window 1301 and a relay station mode 1320. As shown, the TDM window 1301 separates the backhaul link from the access link using TDM techniques in a manner similar to the TDM window 201 discussed above. Likewise, the relay station mode 1320 alternates between a RX and TX operations on the f_DL and f_UL frequencies in a manner similar to the UE2 220 discussed above.

Figure 14:
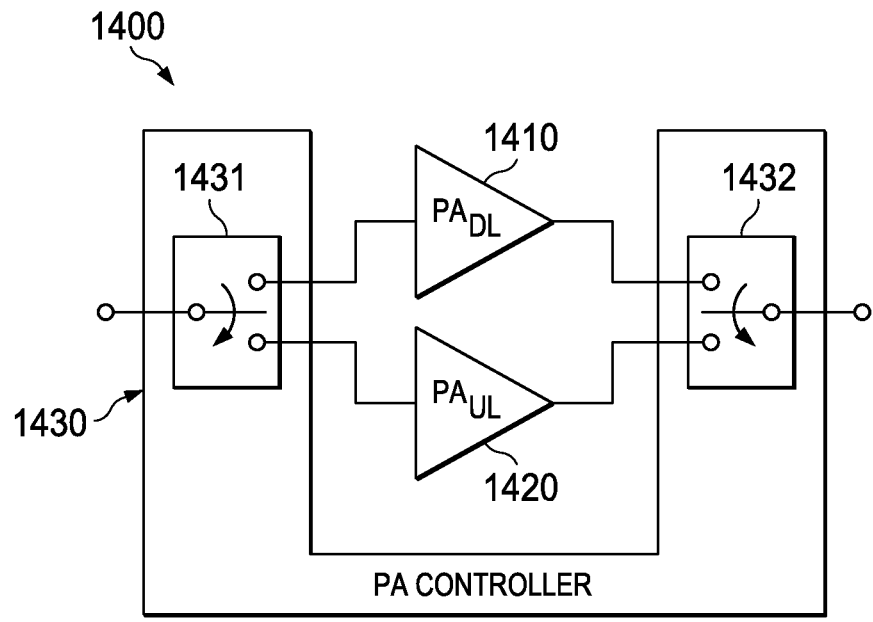
FIG. 14 illustrates a circuit diagram of a narrowband power amplifier architecture.

In some applications, it may be preferable to use multiple narrowband PAs rather than a wideband functional PA to reduce cost. FIG. 14 shows a narrowband PA architecture 1400 which may be interchangeable with either of the wideband PAs 530 or 830. The PA architecture 1400 may comprise a pair of narrowband PAs 1410-1420 and a PA controller 1430. The narrowband PAs 1410-1420 may be similar to the PAs 530 or 830, except that the narrowband PAs 1410-1420 may only be capable of amplifying signals in a certain frequency band. For instance, the narrowband PA 1410 may only be capable of amplifying carrier signals in a frequency band corresponding to f_DL, while the narrowband PA 1420 may only be capable of amplifying carrier signals in a frequency band corresponding to f_UL The PA controller 1430 may be any component capable of switching between the narrowband PAs 1410 and 1420, which may be connected in parallel as shown in FIG. 14. Specifically, the PA controller 1430 may comprise a pair of switches 1431-1432 arranged as shown in FIG. 14, which may be manipulated to alternate between the narrowband PAs 1410 and 1420.

Figure 15:
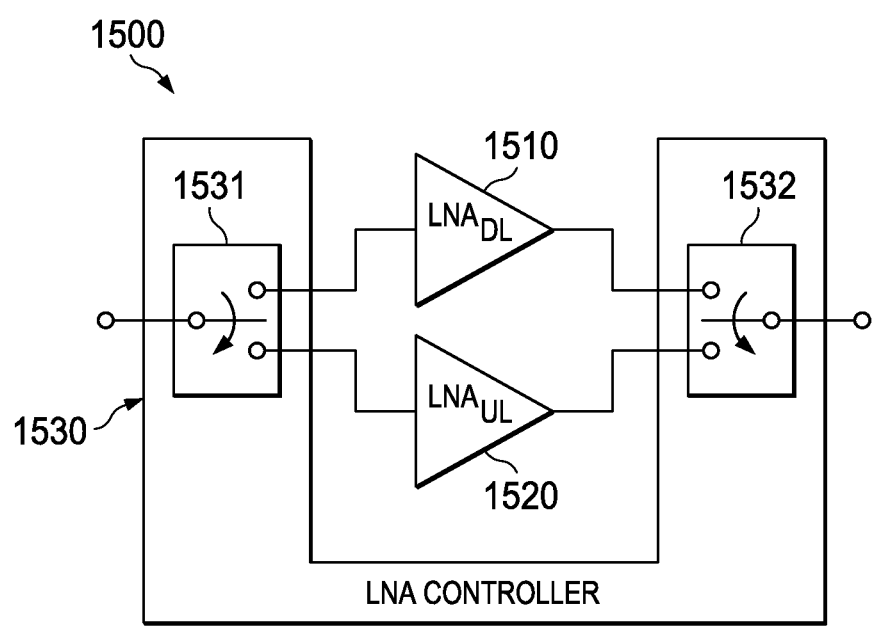
FIG. 15 illustrates a circuit diagram of a narrowband low noise amplifier architecture.

In the same or other applications, it may be preferable to use multiple narrowband LNAs rather than a wideband functional LNA to reduce cost. FIG. 15 shows a narrowband LNA architecture 1500 which may be interchangeable with either of the wideband LNAs 560 or 860. The LNA architecture 1500 may comprise a pair of narrowband LNAs 1510-1520 and a LNA controller 1530. The narrowband LNAs 1510-1520 may be similar to the LNAs 560 or 860, except that the narrowband LNAs 1510-1520 may only be capable of amplifying signals in a certain frequency band. For instance, the narrowband LNA 1510 may only be capable of amplifying carrier signals in a frequency band corresponding to f_DL, while the narrowband LNA 1520 may only be capable of amplifying carrier signals in a frequency band corresponding to f_UL The LNA controller 1530 may be any component capable of switching between the narrowband LNAs 1510 and 1520, which may be connected in parallel as shown in FIG. 15. Specifically, the LNA controller 1530 may comprise a pair of switches 1531-1532 arranged as shown in FIG. 15, which may be manipulated to alternate between the narrowband PAs 1410 and 1420.

Figure 16:
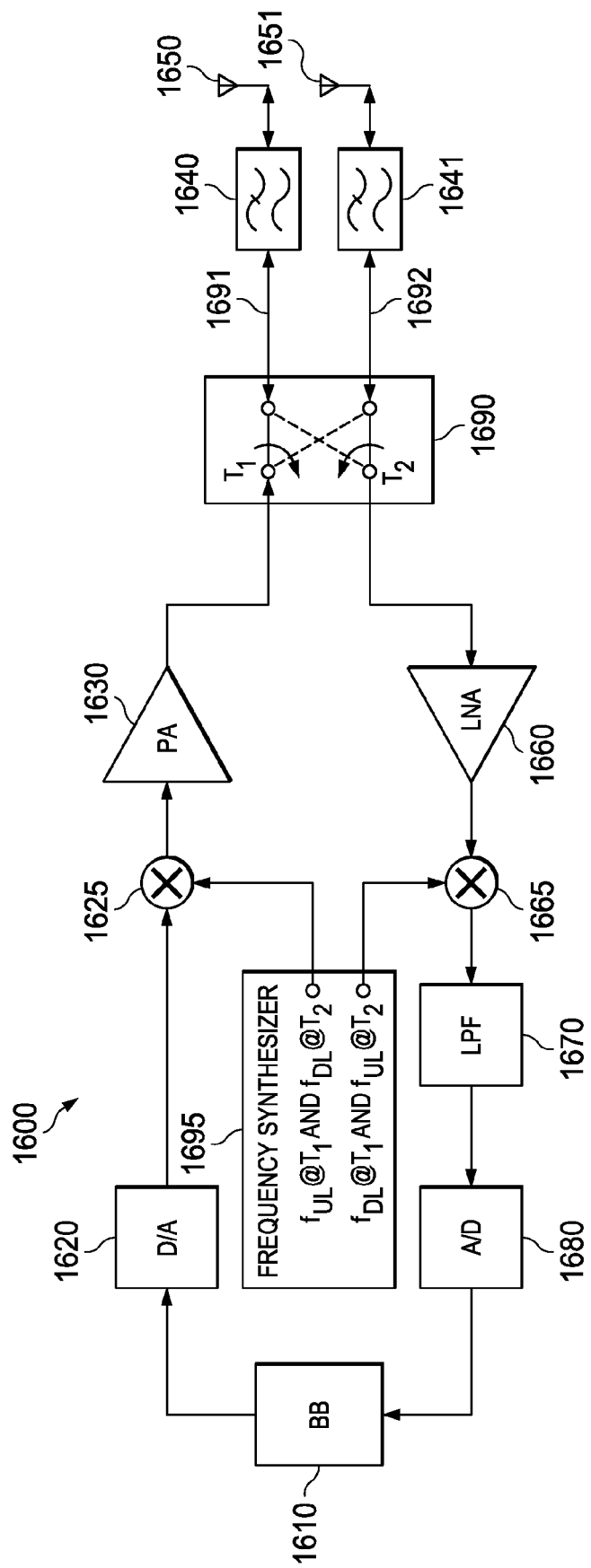
FIG. 16 illustrates a circuit diagram of a third embodiment of a transceiver architecture for achieving direct D2D functionality.

Some embodiments may combine various aspects of the above discussed transceiver architectures to meet various design, cost, or performance objectives. For instance, a four-way switch (e.g., similar to the switch 590) combined with a pair of DPLXs (e.g., similar to the DPLXs 840-841). FIG. 16 illustrates a transceiver architecture 1600 for achieving direct D2D functionality, which may be an alternative embodiment to the transceiver architectures 500 and 800. The transceiver architecture 1600 may comprise a BB processor 1610, a D/A converter 1620, an up-converter 1625, a PA 1630, a pair of band-pass filters 1640-1641, a pair of antennas 1650-1651, an LNA 1660, a down-converter 1665, an LPF 1670, an A/D converter 1680, a switch 1690, and a frequency synthesizer 1695. The BB processor 1610, the D/A converter 1620, the up-converter 1625, the PA 1630, the LNA 1660, the down-converter 1665, the LPF 1670, the A/D converter 1680, the switch 1690, and the frequency synthesizer 1695 may be configured somewhat similarly to the corresponding components 510-595 of the transceiver architecture 500. The band-pass filters 1640-1641 may be any component capable of filtering RF frequencies at the f_UL and f_DL frequency bands (respectively), and the antennas 1650-1651 may be configured similarly to the antennas 1150-1151. In some embodiments, the serially connected up-converter 1625 and PA 1630 may be referred to as a transmission circuit, while the serially connected LNA 1660 and down-converter 1665 may be referred to as a reception circuit. In the same or other embodiments, the transmission circuit may further include the D/A converter 1620, while the reception circuit may further include the LPF 1670 and/or the A/D converter 1680. In some embodiments, multi-component configurations, such as those illustrated in FIGS. 14 and 15, may replace the LNA 1660, the PA 1630, or both.

Although the present invention and its advantages have been described in detail, it should be understood that various changes, substitutions and alterations can be made herein without departing from the spirit and scope of the invention as defined by the appended claims. For example, the order of downloaded patches may be adjusted as desired in order to maximize the potential for recovery or to address any security concerns. Additionally, the precise methods by which components may be verified or loads be validated may also vary from the specific embodiments described here while remaining within the scope of the embodiments.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A first mobile station adapted for direct device-to-device communication using an uplink carrier frequency and a downlink carrier frequency, the first mobile station comprising:
   a frequency synthesizer configured to provide the uplink carrier frequency and the downlink carrier frequency to both an up-converter and a down-converter;
   a transmission circuit comprising the up-converter and configured to generate a cellular uplink signal when the up-converter receives the uplink carrier frequency, and configured to generate a first device-to-device signal when the up-converter receives the downlink carrier frequency, wherein the cellular uplink signal is communicated from the first mobile station to a base station, and wherein the first device-to-device signal is communicated directly from the first mobile station to a second mobile station;
   a reception circuit comprising the down-converter and configured to receive a second device-to-device signal when the down-converter receives the uplink carrier frequency, and configured to receive a cellular downlink signal when the down-converter receives the downlink carrier frequency, wherein both the first mobile station and the second mobile station are registered to end-users, wherein the cellular downlink signal is received by the first mobile station over the downlink carrier frequency during a first period of a time division multiplexing (TDM) synchronization window, wherein the first device-to-device signal is transmitted by the first mobile station over the downlink carrier frequency during a second period of the TDM synchronization window, and wherein the first device-to-device signal carries different data than the cellular downlink signal;
   a first switch coupled to the transmission circuit;
   a second switch coupled to the reception circuit;
   a first duplexer coupled to the first switch via a first link and to the second switch via a second link; and
   a second duplexer coupled to the first switch via a third link and to the second switch via a fourth link, wherein the first switch is positioned in-between the transmission circuit and the first duplexer and in-between the transmission circuit and the second duplexer, and wherein the second switch is positioned in-between the reception circuit and the first duplexer and in-between the reception circuit and the second duplexer.

2. The first mobile station of claim 1, wherein the transmission circuit further comprises a power amplifier coupled in series with the up-converter, and
   wherein the serially connected power amplifier and up-converter are configured to generate both the cellular uplink signal and the first device-to-device signal.

3. The first mobile station of claim 1, wherein the reception circuit further comprises a single low noise amplifier coupled in series with the down-converter, and
   wherein the serially connected low noise amplifier and down-converter is configured to receive the cellular downlink signal and the second device-to-device signal.

4. The first mobile station of claim 1, wherein the frequency synthesizer is configured to:
   provide the uplink carrier frequency to the up-converter during the first period of the TDM synchronization window;
   provide the downlink carrier frequency to the up-converter during the second period of the TDM synchronization window;
   provide the downlink carrier frequency to the down-converter during the first period of the TDM synchronization window; and
   provide the uplink carrier frequency to the down-converter during the second period of the TDM synchronization window.

5. The first mobile station of claim 1, wherein the transmission circuit is further configured to transmit the cellular uplink signal to a base station, and configured to transmit the first device-to-device signal to the second mobile station, and
   wherein the reception circuit is further configured to receive the second device-to-device signal from the second mobile station, and configured to receive the cellular downlink signal from the base station.

6. The first mobile station of claim 1, wherein the first duplexer is configured to receive uplink frequency signals via the first link and forward downlink frequency signals over the second link at the first period of a time division multiplexing (TDM) synchronization window,
wherein the second duplexer is configured to receive downlink frequency signals via the third link and forward uplink frequency signals over the fourth link at the second period of the TDM synchronization window,
wherein the first switch is configured to connect the transmission circuit to the first link during the first period of the TDM synchronization window, and configured to connect the transmission circuit to the third link during the second period of the TDM synchronization window, and
wherein the second switch is configured to connect the reception circuit to the second link during the first period of the TDM synchronization window, and configured to connect the reception circuit to the fourth link during the second period of the TDM synchronization window.

7. The first mobile station of claim 1 further comprising:
a second transmission circuit comprising a second up-converter and configured to generate the cellular uplink signal when the second up-converter receives the uplink carrier frequency, and configured to generate the first device-to-device signal when the second up-converter receives the downlink carrier frequency; and
a second reception circuit comprising a second down-converter and configured to receive the second device-to-device signal when the down-converter receives the uplink carrier frequency, and configured to receive the cellular downlink signal when the down-converter receives the downlink carrier frequency.

8. The first mobile station of claim 7, wherein the frequency synthesizer is configured to provide the uplink carrier frequency and the downlink carrier frequency to both the second up-converter and the second down-converter according to a time division multiplexing (TDM) scheme.

9. The first mobile station of claim 7 further comprising a second frequency synthesizer configured to provide the uplink carrier frequency and the downlink carrier frequency to both the second up-converter and the second down-converter according to a time division multiplexing (TDM) scheme.

10. The first mobile station of claim 7 further comprising a baseband processor comprising:
a first transmission port coupled to the transmission circuit;
a first reception port coupled to the reception circuit;
a second transmission port coupled to the second transmission circuit; and
a second reception port coupled to the second reception circuit,
wherein the baseband processor processes one or more of the cellular uplink signals, the first device-to-device signal, the second device-to-device signal, and the cellular downlink signal using one or more of multiple input multiple output (MIMO) technology and beamforming technology.

11. A first mobile station configured to conduct direct device-to-device communication with a peer mobile station, the first mobile station comprising:
a frequency synthesizer configured to provide a first carrier frequency and a second carrier frequency;
an up-converter coupled to the frequency synthesizer and configured to up-convert a first baseband signal into a cellular uplink signal when receiving the first carrier frequency from the frequency synthesizer, and configured to up-convert the first baseband signal into a first device-to-device signal when receiving the second carrier frequency from the frequency synthesizer, wherein the cellular uplink signal is communicated from the first mobile station to a base station, and wherein the first device-to-device signal is communicated directly from the first mobile station to a second mobile station;
a down-converter coupled to the frequency synthesizer and configured to down-convert a second device-to-device signal into a second baseband signal when receiving the first carrier frequency from the frequency synthesizer, and configured to down-convert a cellular downlink signal into the second baseband signal when receiving the second carrier frequency from the frequency synthesizer, wherein both the first mobile station and the second mobile station are registered to end-users, wherein the first mobile station is configured to communicate the cellular uplink signal over the first carrier frequency during a first period of a time division multiplexing (TDM) synchronization window, and to communicate the second device-to-device signal over the first carrier frequency during a second period of the TDM synchronization window, and wherein the second device-to-device signal carries different data than the cellular uplink signal;
a first switch coupled to the up-converter;
a second switch coupled to the down-converter;
a first duplexer coupled to the first switch via a first link and to the second switch via a second link; and
a second duplexer coupled to the first switch via a third link and to the second switch via a fourth link, wherein the first switch is positioned in-between the up-converter and the first duplexer and in-between the up-converter and the second duplexer, and wherein the second switch is positioned in-between the down-converter and the second duplexer and in-between the down-converter and the first duplexer.

12. The first mobile station of claim 11, wherein both the cellular uplink signal and the second device-to-device signal share the first carrier frequency according to a time division multiplexing (TDM) scheme, and wherein both the first device-to-device signal and the cellular downlink signal share the second carrier frequency according to the TDM scheme.

13. The first mobile station of claim 11, wherein the first carrier frequency is an uplink carrier frequency, wherein the second carrier frequency is a downlink carrier frequency, and wherein the cellular uplink signal and cellular downlink signal are communicated according to a frequency division duplex scheme with respect to one another.

* * * * *